(12) United States Patent
Kita et al.

(10) Patent No.: US 6,213,241 B1
(45) Date of Patent: Apr. 10, 2001

(54) POWER TRANSMITTING SYSTEM IN FOUR-WHEEL DRIVE VEHICLE

(75) Inventors: Kanji Kita; Takuya Kurokawa, both of Mooka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/172,091

(22) Filed: Oct. 14, 1998

(30) Foreign Application Priority Data

Oct. 22, 1997 (JP) .................................................. 9-289848

(51) Int. Cl.⁷ .................................................. B60K 17/34
(52) U.S. Cl. .................................................. 180/248
(58) Field of Search .................................... 180/248, 249, 180/250, 242, 243, 308, 197, 244, 245, 251

(56) References Cited

U.S. PATENT DOCUMENTS

| 4,883,141 | * 11/1989 | Walker ................................. 180/243 |
| 5,221,101 | 6/1993 | Okubo et al. . |
| 5,353,889 | 10/1994 | Hamada . |
| 5,538,400 | * 7/1996 | Konishi et al. ...................... 417/220 |
| 5,562,432 | * 10/1996 | Semba et al. .......................... 418/26 |
| 5,941,334 | * 8/1999 | Inagaki ................................ 180/242 |

FOREIGN PATENT DOCUMENTS

0450353 A1   10/1991   (EP) .

* cited by examiner

Primary Examiner—Kevin Hurley
(74) Attorney, Agent, or Firm—Arent Fox Kintner Plotkin & Kahn, PLLC (57) ABSTRACT

A hydraulic coupling device includes left and right vane pumps which discharge working oil in response to the relative rotation of main driven wheels and left and right subsidiary driven wheels. First orifices are defined in a side plate disposed between the left and right vane pumps to permit communication between intake ports and discharge ports in the vane pumps. Orifices are defined in the side plate to permit communication between the intake ports and between the discharge ports in the vane pumps. With the above arrangement, in a hydraulic coupling device of a power transmitting system in a four-wheel drive vehicle, the formation of the orifices can be easily carried out, and the characteristics of the orifices can be stabilized.

10 Claims, 12 Drawing Sheets

POWER TRANSMITTING SYSTEM IN FOUR-WHEEL DRIVE VEHICLE

BACKGROUND OF THE INVENTION

1. Field of the Invention

The present invention relates to a power transmitting system in a four-wheel drive vehicle including a hydraulic coupling device comprising a pair of vane pumps.

2. Description of the Prior Art

A power transmitting system in a four-wheel drive vehicle is already known from Japanese Patent Application Laid-open No. 3-104736. In this power transmitting system, an orifice which permits the communication between an intake port and a discharge port in each of the vane pumps, is formed by a small bore provided in a vane. Orifices which permit the communication between the intake ports and the discharge ports in the left and right vane pumps, are formed by clearances between a side plate partitioning rotors of the vane pumps and a cam ring.

In the above known system, since an orifice for communication between the intake port and the discharge port in each of the vane pumps, is formed by the small bore provided in the vane, the manufacturing steps required for providing the orifices in a large number of the vanes are troublesome, and further, it cannot be avoided that variations in size and shape of the orifices in the vanes are generated. For this reason, there is a possibility that the operating characteristics of the hydraulic coupling device are not stable. In addition, since the orifices for communication between the intake ports and the discharge ports in the left and right vane pumps are formed by clearances between the side plate and the cam ring, it is difficult to ensure the dimensional accuracy of the orifices, and there is a possibility that the operating characteristics of the hydraulic coupling device are not stable.

SUMMARY OF THE INVENTION

Accordingly, it is an object of the present invention to ensure that the formation of an orifice can be easily performed, and the characteristics of the orifice are stable in a power transmitting system in a four-wheel drive vehicle, including a hydraulic coupling device.

To achieve the above object, according to a first aspect and feature of the present invention, there is provided a power transmitting system in a four-wheel drive vehicle, comprising an input shaft driven along with left and right main driven wheels by an engine, a left drive shaft connected to a left subsidiary driven wheel, a right drive shaft connected to a right subsidiary driven wheel, a left vane pump operated in accordance with the difference between the relative rotational speeds of the input shaft and the left drive shaft, and a right vane pump operated in accordance with the difference between relative rotational speeds of the input shaft and the right drive shaft. A left first orifice is provided between an intake port and a discharge port in the left vane pump, a right first orifice is provided between an intake port and a discharge port in the right vane pump, and second orifices are provided between the intake port in the left vane pump and the intake port in the right vane pump and between the discharge port in the left vane pump and the discharge port in the right vane pump. Each of the vane pumps includes a rotor in a space surrounded by a cam ring and a side plate, and the plurality of vanes are radially slidably carried on the rotor in sliding contact at outer ends thereof with the cam ring. The first orifice, which is provided in the side plate, for communication between the intake port and the discharge port, is concavely provided in the side plate of the vane pumps.

With the above arrangement, when there is no difference in the relative numbers of rotation between the main and subsidiary driving wheels, the left and right vane pumps are not operated. Therefore, the transmission of power from the input shaft to the left and right drive shafts is not carried out, whereby the vehicle is brought into a two-wheel drive state. When the main driven wheels slip during starting or sudden acceleration of the vehicle on a low friction coefficient road, a difference in numbers of rotation is generated between the main and subsidiary driven wheels which results in the operation of the left and right vane pumps. Thus, working oil discharged from the vane pumps, is passed through the left and right first orifices, thereby generating a load in the left and right vane pumps. As a result, the transmission of the power from the input shaft to the left and right drive shafts is carried out, whereby a portion of the driving force of the main driven wheels is distributed to the subsidiary driven wheels to achieve a four-wheel drive state of the vehicle, in which both of the main and subsidiary driven wheels are driven.

When tight turning of the vehicle is performed at a low speed, a difference in numbers of rotation is generated between the main and subsidiary driven wheels and hence, the left and right vane pumps discharge different amounts of working oil. The working oil flows via the left and right first and second orifices and for this reason, a large load is prevented from being generated in both of the vane pumps. Consequently, it is possible to alleviate a so-called tight corner braking phenomenon.

Even if the left and right main driven wheels and one of the left and right subsidiary driven wheels fall into a muddy spot and slip, the driving force is transmitted to the other left or right subsidiary driven wheel which is on a road surface of a higher friction coefficient through the vane pump on the side of the other subsidiary driven wheel. Therefore, the function of a differential limiting mechanism is exhibited, thereby enabling the wheels to escape from the muddy spot.

The intake port and the discharge port are concavely provided in the side plate, and the first orifice permitting communication between the intake port and the discharge port is provided in the side plate and therefore, the number of working or machining steps can be reduced, as compared with the case where an orifice is provided in the vane. Further, the working accuracy for the first orifice can be enhanced to stabilize the characteristics of the hydraulic coupling device. In addition, the length of an oil passage connected to the first orifice can be kept to a minimum to reduce the size of the hydraulic coupling device and moreover, the first orifice and the oil passage can be easily formed by working or machining without bringing about an increase in number of parts.

According to a second aspect and feature of the present invention, the left and right vane pumps include a common side plate, and the intake ports and the discharge ports of the vane pumps are provided in opposite sides of the side plate, so that they are opposed to each other, with the bottoms of the intake ports and the bottoms of the discharge ports being in communication with each other through the second orifice extending through the side plate.

With the above arrangement, the common side plate is used for the left and right vane pumps and therefore, the number of parts can be reduced. Moreover, the bottoms of the intake ports as well as the bottoms of the discharge ports in both the vane pumps provided in the opposite sides of the side plate, are in communication with each other through the orifice provided in the side plate. Therefore, as compared with the case where an orifice is formed by a clearance between the cam ring and the side plate, the number of working or machining steps can be reduced, and the working accuracy for the orifice can be enhanced to stabilize the characteristics of the hydraulic coupling device. Moreover, it is possible to prevent the second orifice from being occluded by the vane. In addition, the length of the oil passage connected to the second orifice can be kept to a minimum to reduce the size of the hydraulic coupling device, and moreover, the second orifice and the oil passage can be easily formed by working or machining without bringing about an increase in number of parts.

According to a third aspect and feature of the present invention, a relief valve is provided in parallel to the first orifice and is adapted to be opened in accordance with an increase in pressure discharged from the vane pump.

With the above arrangement, when the difference in numbers of rotation between the main and subsidiary driven wheels is increased to increase the hydraulic pressure upstream of the first orifice, the relief valve is opened, thereby permitting working oil to be passed through the relief valve which has a smaller flow resistance, rather than through the first orifice. Therefore, the load of the vane pump can be set at any value in accordance with the opening pressure for the relief valve to regulate the driving force transmitted to the subsidiary driven wheels.

According to a fourth embodiment of the present invention, a centrifugal valve is provided between the intake port and the discharge port and adapted to be opened in accordance with an increase in numbers of rotation of the input shaft.

With the above arrangement, when the numbers of rotation of the input shaft is increased due to the traveling of the vehicle at a high speed, the centrifugal valve is opened to shortcircuit the path between the intake port and the discharge port. Therefore, during traveling of the vehicle at high speed, the vehicle can be brought into a two-wheel drive state in which only the main driven wheels are driven.

According to a fifth embodiment of the present invention, an annular vane push-up port faced by radially inner ends of the vanes and an orifice plate supporting groove connecting to the vane push-up port between the intake port and the discharge port, are defined in the side plate, and the orifice plate having the first orifices defined therein, is loosely fitted in the orifice plate supporting groove.

With the above arrangement, when the pressure in the intake port is increased to a higher level during rotation of the vane pump in a normal direction, the orifice plate is pushed against the side of the orifice plate supporting groove adjacent the intake port, by the higher pressure, and the higher pressure in the discharge port is introduced via the orifice plate supporting groove, to the vane push-up port, whereby the vanes can be biased toward the cam ring. When the pressure in the discharge port is increased to a higher level during rotation of the vane pump in a reverse direction, the orifice plate is pushed against the side of the orifice plate supporting groove adjacent the intake port by the higher pressure, and the higher pressure in the intake port is introduced via the orifice plate supporting groove to the vane push-up port, whereby the vanes can be biased toward the cam ring.

The above and other objects, features and advantages of the invention will become apparent from the following description of the preferred embodiment taken in conjunction with the accompanying drawings.

BRIEF DESCRIPTION OF THE DRAWINGS

FIGS. 1 to 8 show a first embodiment of the present invention, wherein

FIGS. 12 and 13 show a fifth embodiment of the present invention, wherein

FIGS. 14 to 16 show a sixth embodiment of the present invention, wherein

DETAILED DESCRIPTION OF THE PREFERRED EMBODIMENTS

The present invention will now be described by way of an embodiment with reference to the accompanying drawings.

Figure 1:
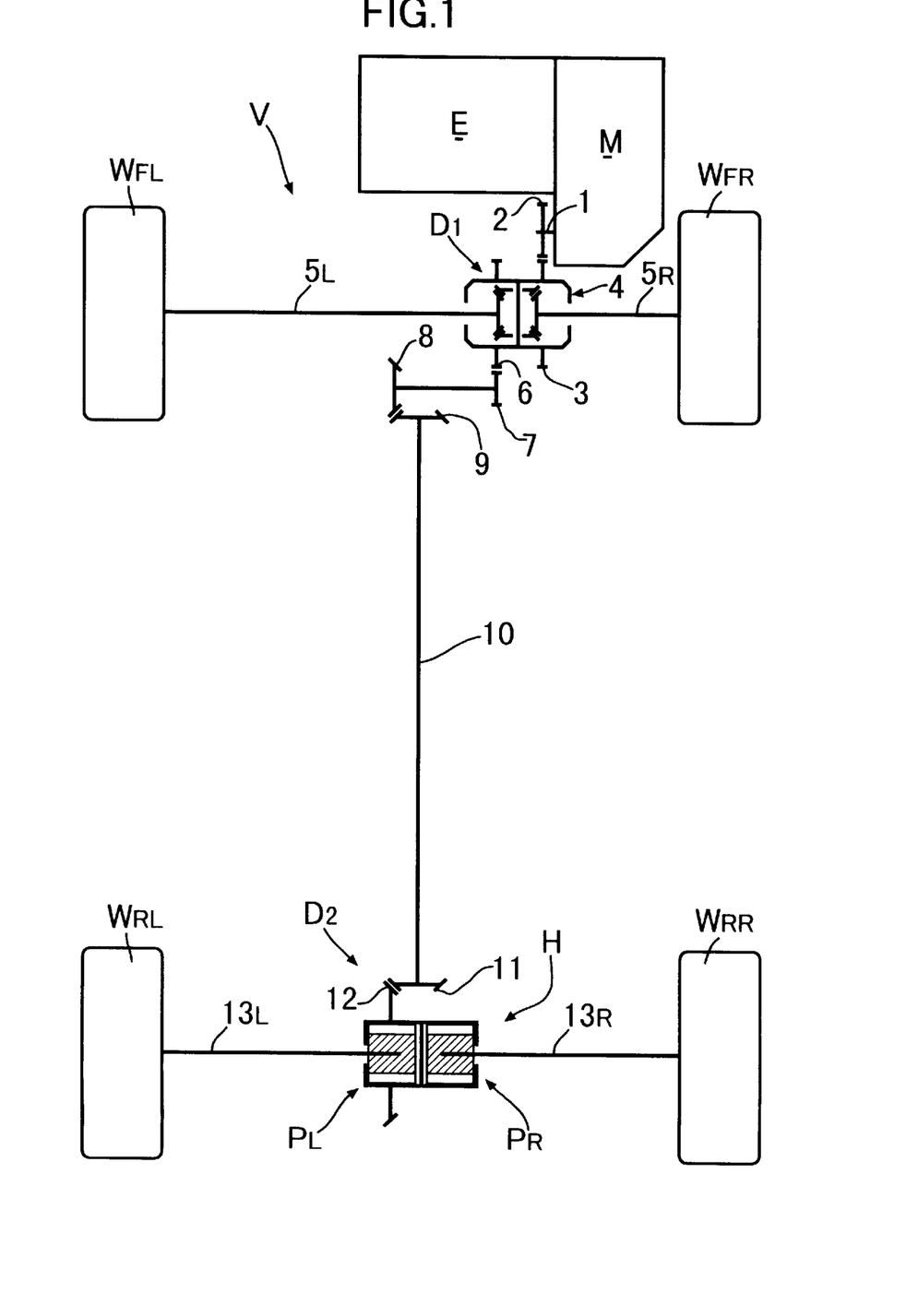
FIG. 1 is a schematic illustration of a power transmitting system in a four-wheel drive vehicle.

As shown in FIG. 1, a four-wheel drive vehicle V includes an engine E disposed laterally at a front portion of a vehicle body, and a transmission M coupled to a right side of the engine E. A first power transmitting section $D_1$ for transmitting the driving force from the transmission M to left and right front wheels $W_{FL}$ and $W_{FR}$ serving as main driven wheels, comprises a first spur gear 2 provided on an output shaft 1 of the transmission M, a second spur gear 3 meshed with the first spur gear 2, a bevel gear-type front differential 4 driven by the second spur gear 3, and left and right axles $5_L$ and $5_R$ extending laterally from the front differential 4 and connected to the front wheels $W_{FL}$ and $W_{FR}$ serving as the main driven wheels.

A second power transmitting section $D_2$ for transmitting the driving force from the first power transmitting section $D_1$ to rear wheels $W_{RL}$ and $W_{RR}$ serving as subsidiary driven wheels, comprises a third spur gear 6 provided in the differential box of the front differential 4, a fourth spur gear 7 meshed with the third spur gear 6, a first bevel gear 8 rotated with the fourth spur gear 7, and a second bevel gear 9 meshed with the first bevel gear 8. A propeller shaft 10 includes the second bevel gear 9 at its front end and extends rearwards of the vehicle body. A third bevel gear 11 is provided at a rear end of the propeller shaft 10, a fourth bevel gear 12 is meshed with the third bevel gear 11, a hydraulic coupling device H is driven by the fourth bevel gear 12, and left and rear axles $13_L$ and $13_R$ extend laterally from the hydraulic coupling device H and are connected to the rear wheels $W_{RL}$ and $W_{RR}$.

The structure of the hydraulic coupling device H will be described below with reference to FIGS. 2 to 4.

The hydraulic coupling device H includes a casing 24 comprised of a substantially disk-shaped left casing member 21 and a substantially cup-shaped right casing member 22 which are coupled to each other by bolts 23. The casing 24 is rotatably carried in a housing 26 on a pair of ball bearings $25_L$ and $25_R$. The fourth bevel gear 12 is fastened to the right casing member 22 by the bolts 23 and hence, the rotation of the propeller shaft 10 is transmitted through the third and fourth bevel gears 11 and 12 to the casing 24. A right end of the axle $13_L$ of the left rear wheel $W_{RL}$ extending through a central portion of the left casing member 21 and a left end of the axle $13_R$ of the right rear wheel $W_{RR}$ extending through a central portion of the right casing member 22, are coaxially opposed to each other within the casing 24.

A left vane pump $P_L$ and a right vane pump $P_R$ are disposed laterally symmetrically within the casing 24. A body portion of the right casing member 22 constitutes a cam ring 27 which is elliptic in section, and a first side plate 28 and a second side plate 29 are slidably carried within the right casing member 22. A body portion of the left casing member 21 constitutes a third side plate 30. The left vane pump $P_L$ includes a circular rotor $31_L$ which is clamped between the third side plate 30 and the first side plate 28 and is spline-coupled to the left axle $13_L$. A plurality of vanes 32 are radially slidably carried in vane grooves $31_1$ radially defined in the rotor $31_L$, with outer ends of the vanes 32 in sliding contact with an inner peripheral surface of the cam ring 27. Likewise, the right vane pump $P_R$ includes a circular rotor $31_R$ which is clamped between the second side plate 29 and the first side plate 28 and is spline-coupled to the right axle $13_R$. A plurality of vanes 32 are radially slidably carried in vane grooves $31_1$ radially defined in the rotor $31_R$, with outer ends of the vanes 32 in sliding contact with the inner peripheral surface of the cam ring 27.

A belleville spring 33 is disposed between a right side of the second side plate 29 and an inner surface of the right casing member 22, so that the second side plate 29, the rotor $31_R$, the first side plate 28 and the rotor $31_L$ are biased toward the third side plate 30 by the resilient force of the belleville spring 33. As a result, a predetermined surface pressure is generated between a right side of the third side plate 30 and a left side of the rotor $31_L$, between a right side of the rotor $31_L$ and a left side of the first side plate 28, between a right side of the first side plate 28 and a left side of the rotor $31_R$. and between a right side of the rotor $31_R$ and a left side of the second side plate 29, leading to an enhanced sealability. A ring-shaped foam member 34 formed of a material having excellent oil and heat resistances such as NBR, acrylic rubber or the like is positioned in a space inside the belleville spring 33. When working oil filling the casing 24, is thermally expanded with a change in temperature, the ring-shaped foam member 34 shrinks to absorb the thermal expansion of the working oil.

Figure 4:
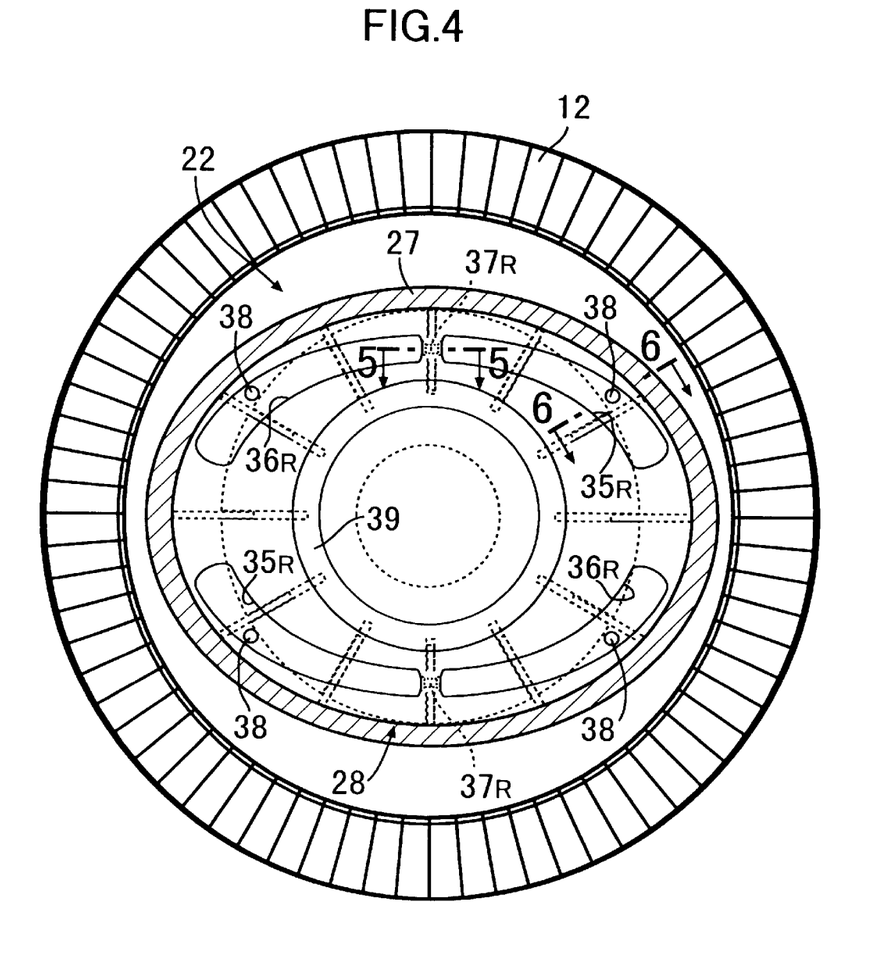
FIG. 4 is a sectional view taken along a line 4—4 in FIG. 2.

As can be seen from FIG. 4, a pair of intake ports $35_R$ and a pair of discharge ports $36_R$ of the right vane pump $P_R$ are provided concavely in the right side of the first side plate 28. A pair of intake ports $35_L$ and a pair of discharge ports $36_L$ of the left vane pump $P_L$ are provided concavely in the left side of the first side plate 28, so that they are opposed to the backs of the intake ports $35_R$ and a pair of discharge ports $36_R$ (see FIGS. 5 and 6).

Figure 6:
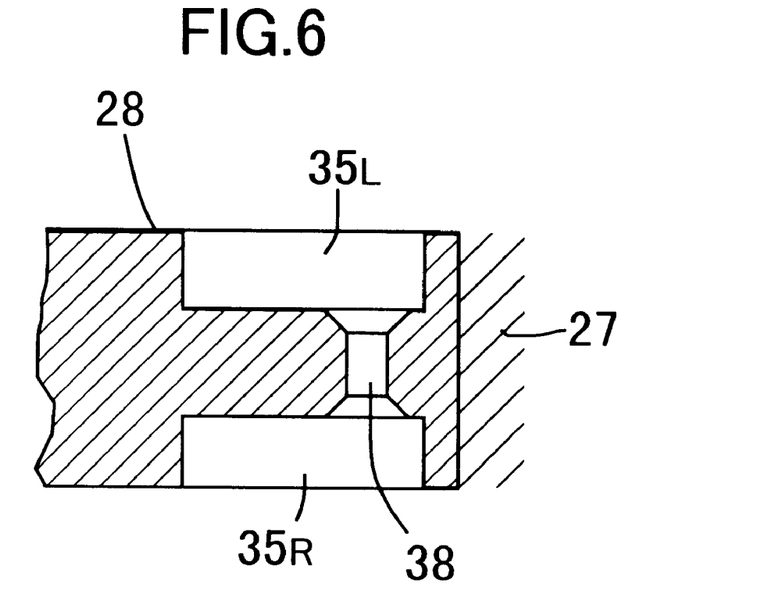
FIG. 6 is an enlarged sectional view taken along a line 6—6 in FIG. 4.
Figure 7:
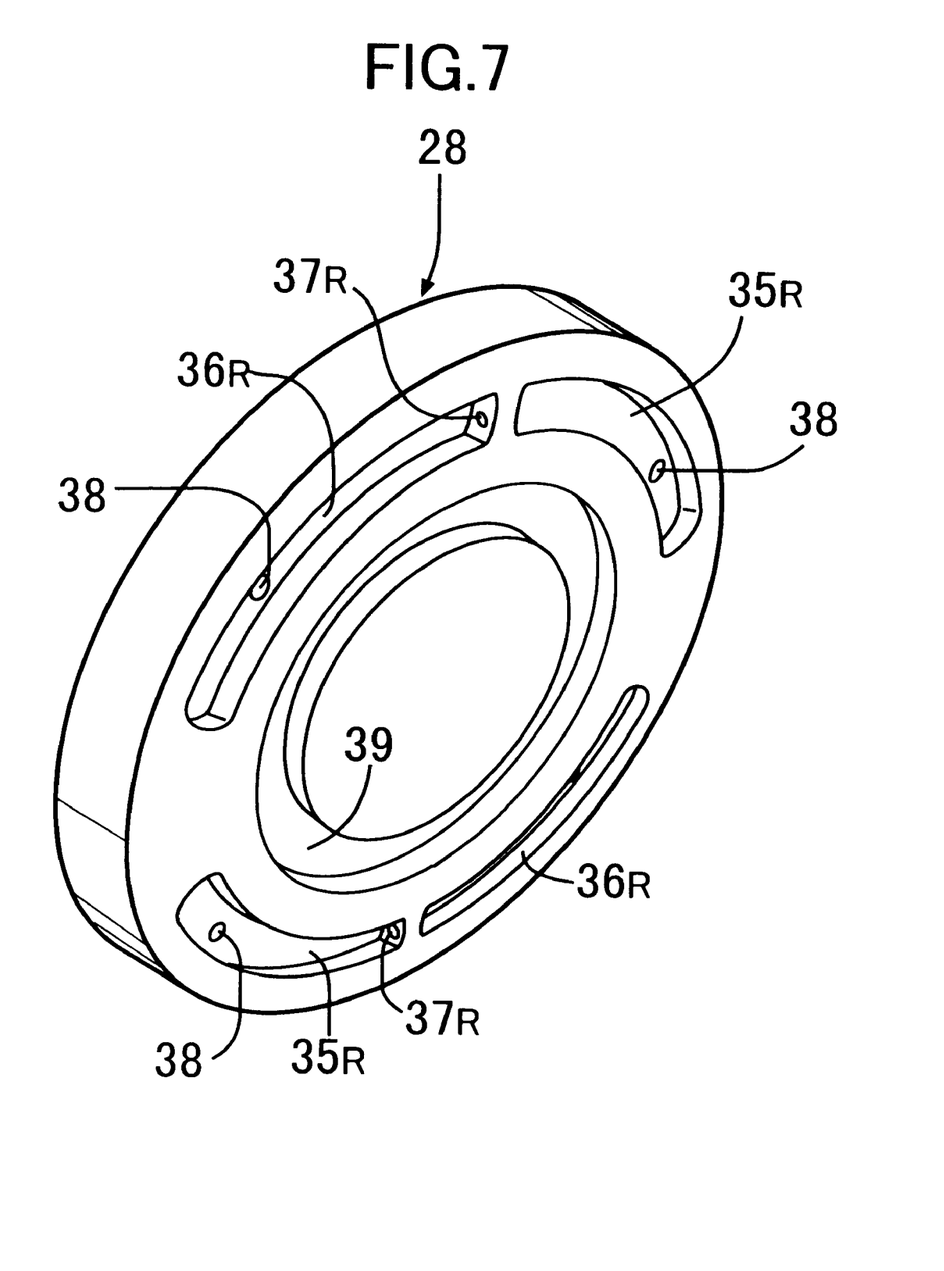
FIG. 7 is a perspective view of a first side plate.

As can be seen from FIGS. 6 and 7, the intake port $35_R$ and the discharge port $36_R$ adjacent each other, communicate with each other through a right-side first orifice $37_R$ at opposite ends of the right side of the first side plate in the direction of its shorter diameter. Likewise, the intake port $35_L$ and the discharge port $36_L$ adjacent each other, communicate with each other through a left-side first orifice $37_L$ at opposite ends of the left side of the first side plate in the direction of its shorter diameter.

As can be seen from FIGS. 6 and 7, a second orifice 38 is defined between the intake ports $35_L$ and $35_R$ which are defined in an opposed relation in the left and right sides of the first side plate 28, and a second orifice 38 is defined between the discharge ports $36_L$ and $36_R$ which are likewise defined in an opposed relation in the left and right sides of the first side plate 28.

Figure 2:
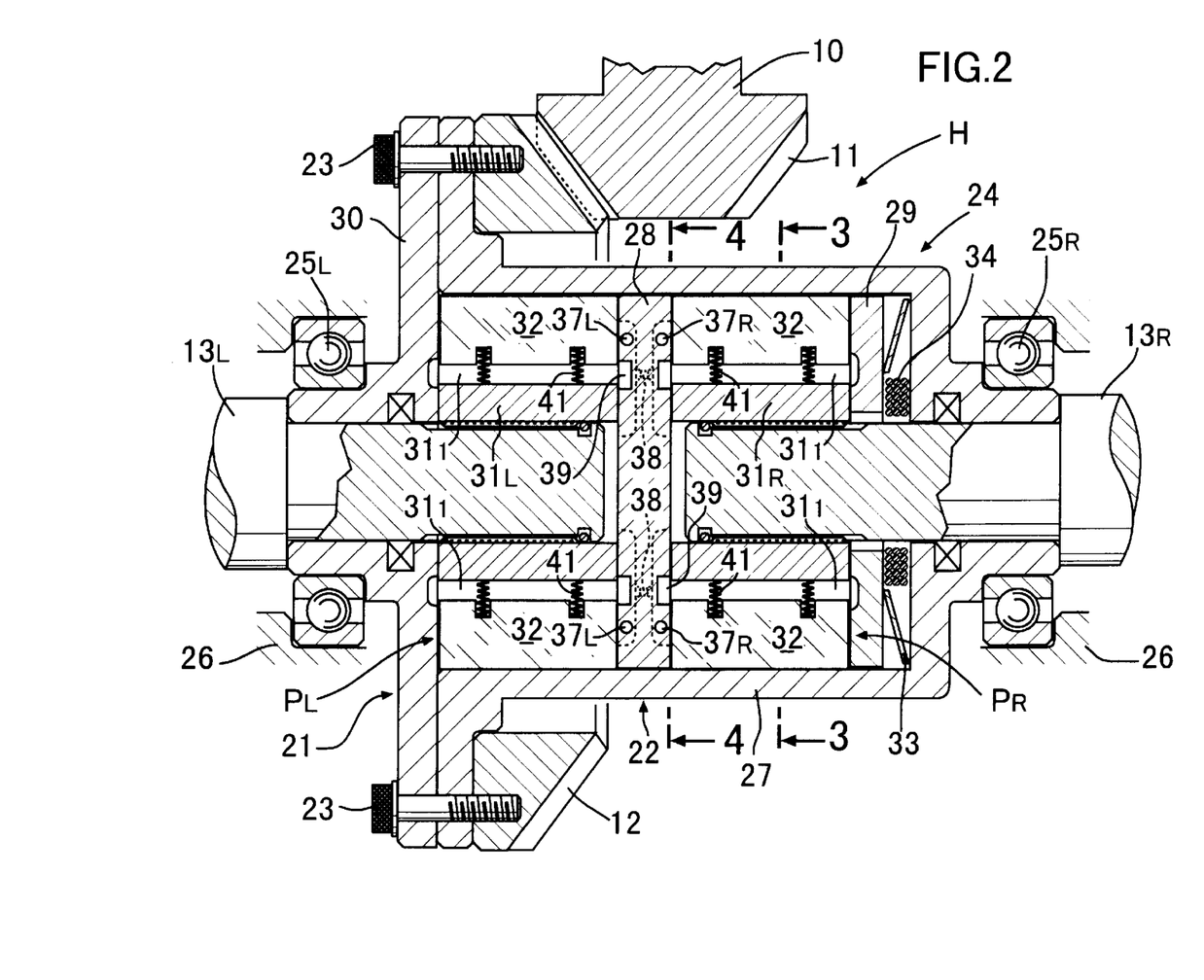
FIG. 2 is a vertical sectional view of a hydraulic coupling device.
Figure 3:
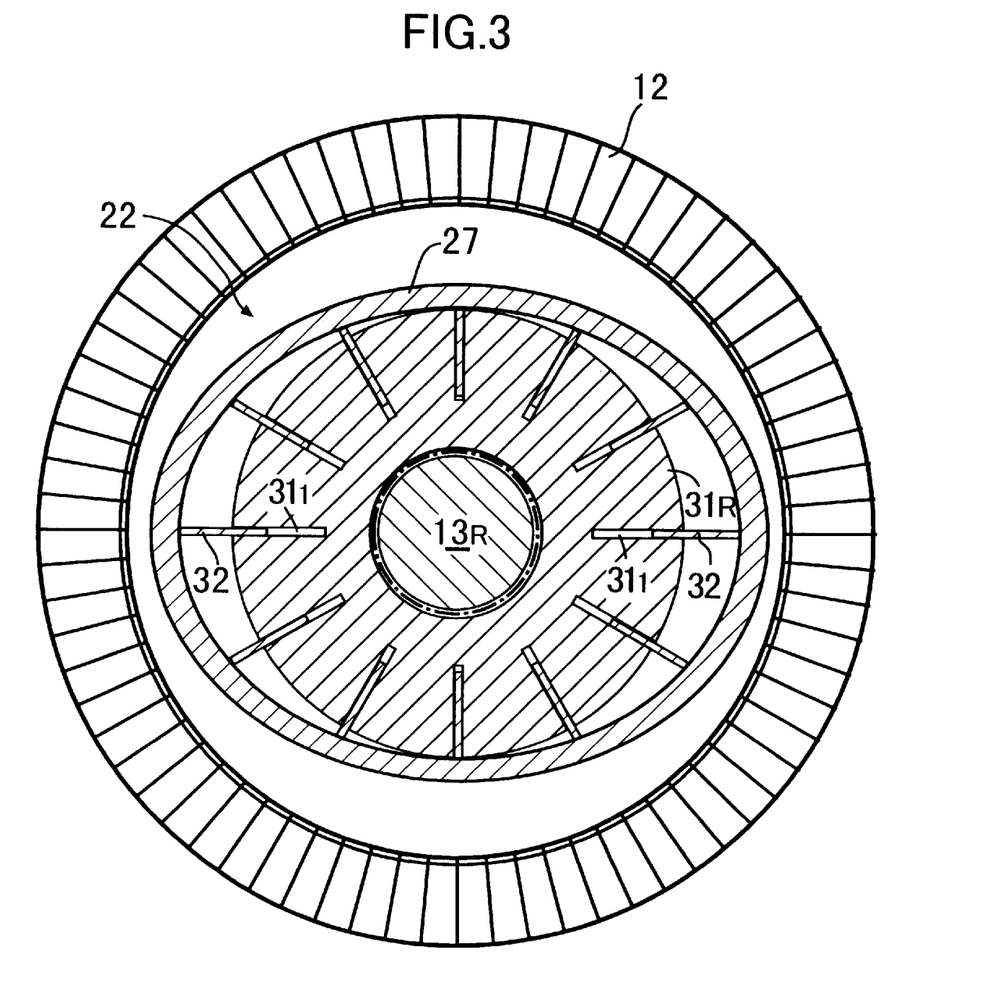
FIG. 3 is a sectional view taken along a line 3—3 in FIG. 2.

As can be seen from FIGS. 4 and 7, an annular vane push-up port 39 is defined in the right side of the first side plate 28 to communicate with the bottoms of the vane grooves $31_1$ (see FIG. 2). The vanes 32 are biased radially outwards by springs 41 (see FIG. 2) disposed in the bottoms of the vane grooves $31_1$, thereby ensuring a sealability between the outer ends of the vanes 32 and the inner peripheral surface of the cam ring 27. The left vane pump $P_L$ also includes the same biasing means as those for the vanes 32 described above.

Figure 8:
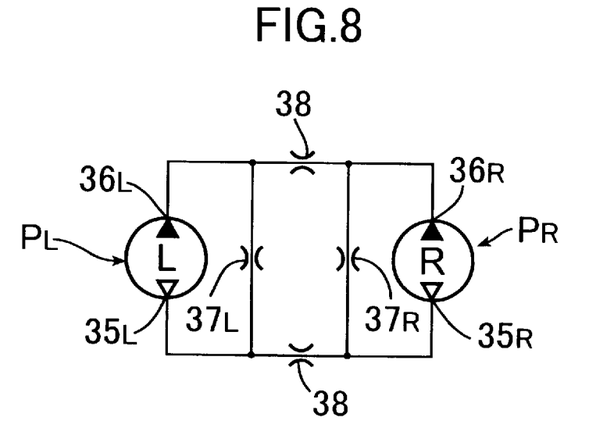
FIG. 8 is a diagram of a hydraulic pressure circuit of the hydraulic coupling device.

FIG. 8 shows a hydraulic pressure circuit of the hydraulic coupling device H. As can be seen from FIG. 8, the intake port $35_L$ and the discharge port $36_L$ of the left vane pump $P_L$ communicate with each other through the left first orifice $37_L$ defined in the first side plate 28, and the intake port $35_R$ and the discharge port $36_R$ of the right vane pump $P_R$ communicate with each other through the right first orifice $37_R$ defined in the first side plate 28. The intake ports $35_L$ and $35_R$ of the left and right vane pumps $P_L$ and $P_R$ communicate with each other through the second orifice 38 defined in the first side plate 28, and the discharge ports $36_L$ and $36_R$ of the left and right vane pumps $P_L$ and $P_R$ communicate with each other through the second orifice 38 defined in the first side plate 28.

The operation of the first embodiment of the present invention will be described below.

In a state in which the vehicle is traveling at a constant speed, the driving force of the engine E is transmitted from the output shaft 1 through the first spur gear 2, the second spur gear 3, the front differential 4 and the left and right axles $5_L$ and $5_R$ to the left and right front wheels $W_{FL}$ and $W_{FR}$. During this time, the rotation of the third spur gear 6 of the front differential 4 causes the casing 24 (namely the cam ring 27) of the hydraulic coupling device H to be rotated through the fourth spur gear 7, the first bevel gear 8, the second bevel gear 9, the propeller shaft 10, the third bevel gear 11 and the fourth bevel gear 12. On the other hand, the rotation of the rear wheels $W_{RL}$ and $W_{RR}$ driven by the friction force received from a road surface with the traveling of the vehicle V is transmitted through the left and right axles $13_L$ and $13_R$ to the rotor $31_L$ of the left vane pump $P_L$ and the rotor $31_R$ of the right vane pump $P_R$. When there is no slipping produced in the front wheels $W_{FL}$ and $W_{FR}$ and hence, when the numbers of rotation of the front wheels $W_{FL}$ and $W_{FR}$ and the rear wheels $W_{RL}$ and $W_{RR}$ are equal to each other, the numbers of rotation of the cam ring 27 and numbers of rotation of the left and right rotors $31_L$ and $31_R$ are equal to each other, whereby no relative rotation is produced between the cam ring 27 and the left and right rotors $31_L$ and $31_R$. As a result, the left and right vane pumps $P_L$ and $P_R$ do not generate working oil. For this reason, the hydraulic coupling device H does not transmit the driving force, whereby the vehicle is in a front wheel drive state.

When the front wheels $W_{FL}$ and $W_{FR}$, to which the driving force from the engine E is directly applied, slip during starting or sudden acceleration of the vehicle on a low friction coefficient road, a relative rotation is produced between the cam ring 27 of the left and right hydraulic pumps $P_L$ and $P_R$ rotated in operative association with the rotation of the front wheels $W_{FL}$ and $W_{FR}$ and the rotors $13_L$ and $13_R$ of the left and right hydraulic pumps $P_L$ and $P_R$ rotated in operative association with the rotation of the rear wheels $W_{RL}$ and $W_{RR}$, whereby the left and right vane pumps $P_L$ and $P_R$ draw the working oil discharged from the discharge ports $36_L$ and $36_R$ through the intake ports $35_L$ and $35_R$. The working oil discharged from the discharge ports $36_L$ and $36_R$ is passed through the left and right first orifices $37_L$ and $37_R$ back to the intake ports $35_L$ and $35_R$. However, a load is generated in the left and right vane pumps $P_L$ and $P_R$ by the resistance to the flow during this time and is transmitted as a driving force to the left and right rear wheels $W_{RL}$ and $W_{RR}$. During slipping of the front wheels $W_{FL}$ and $W_{FR}$, the vehicle is brought into a four-wheel drive state, wherein the traction of the vehicle V can be increased. In this case, the more the diameter of the orifices $37_L$ and $37_R$ is increased, the more the load on the left and right vane pumps $P_L$ and $P_R$ is reduced, whereby the driving force transmitted to the rear wheels $W_{RL}$ and $W_{RR}$ is increased.

When tight turning of the vehicle V is performed at a low speed, the average radius of turning loci of the left and right rear wheels $W_{RL}$ and $W_{RR}$ is smaller than that of the left and right front wheels $W_{FL}$ and $W_{FR}$. For this reason, a relative rotation is produced between the cam ring 27 connected to the front wheels $W_{FL}$ and $W_{FR}$ and the left and right rotors $13_L$ and $13_R$ connected to the rear wheels $W_{RL}$ and $W_{RR}$. Moreover, as for the radii of the turning loci of the left and right rear wheels $W_{RL}$ and $W_{RR}$, the radius of the turning locus of the outer wheel during turning of the vehicle is larger, and the radius of the turning locus of the inner wheel during turning of the vehicle is smaller. For this reason, the magnitude of the relative rotation is different between the left and right vane pumps $P_L$ and $P_R$. During this time, the working oil discharged from the discharge ports $36_L$ and $36_R$ of the left and right vane pumps $P_L$ and $P_R$ flows via the left and right first orifices $37_L$ and $37_R$ back to the intake ports $35_L$ and $35_R$. In addition, a difference between the amounts of working oil discharged by the left and right vane pumps $P_L$ and $P_R$ is countervailed by the flow of working oil to and from the left and right vane pumps $P_L$ and $P_R$ and hence, a large load is prevented from being produced in the vane pumps $P_L$ and $P_R$. As a result, it is possible to alleviate tight corner braking which is produced due to a difference between the radii of turning loci of wheels, when the four-wheel drive vehicle V is turned tightly at a lower speed.

For example, in the case where the left and right front wheels $W_{FL}$ and $W_{FR}$ and the right rear wheel $W_{RR}$ excluding the left rear wheel $W_{RL}$, have fallen into a muddy spot, when the cam ring 27 is rotated in operative association with the slipping front wheels $W_{FL}$ and $W_{FR}$, the right rear wheel $W_{RR}$ which has fallen into the muddy spot with the friction reduced, is also slipping due to the driving force transmitted from the cam ring 27 through the vanes 32, the rotor $31_R$ and the axle $13_R$. However, the driving force is transmitted through the vanes 32, the rotor $31_L$ and the axle $13_L$ to the left rear wheels $W_{RL}$ which is on a road of a higher friction coefficient, thereby enabling the escaping of the wheels from the muddy spot by such driving force. Namely, the hydraulic coupling device H in the present embodiment enables the function of a differential limiting mechanism (LSD) to be exhibited. In this case, the more the diameter of the second orifice is reduced, the more the differential limiting function can be intensified.

Figure 5:
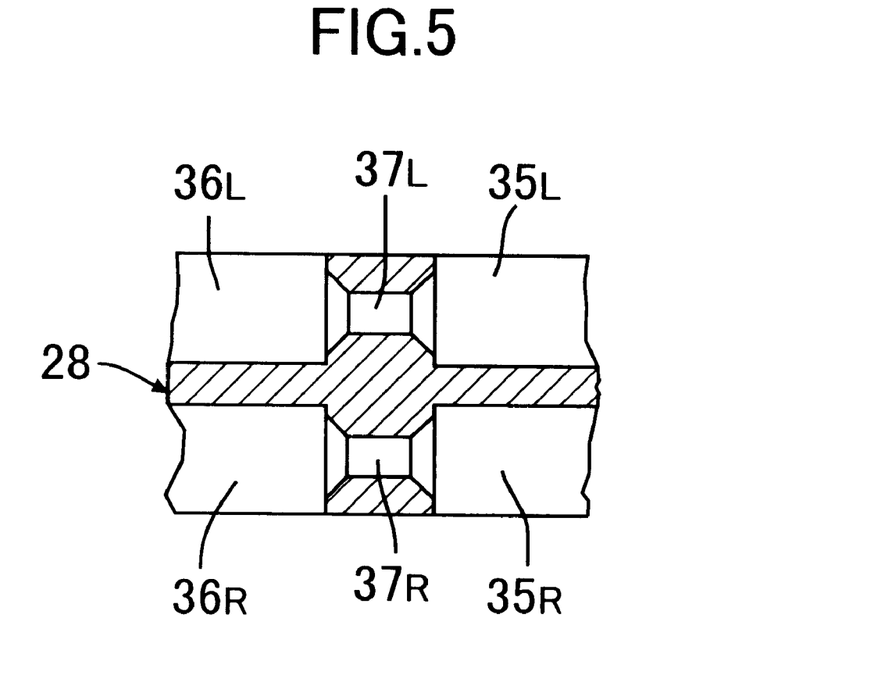
FIG. 5 is an enlarged sectional view taken along a line 5—5 in FIG. 4.

As shown in FIGS. 5 and 6, the left and right first orifices $37_L$ and $37_R$ and the second orifice 38 are provided in the first side plate 28, and therefore, the accuracy of machining of these orifices can be enhanced to stabilize the operating characteristics of the hydraulic coupling device H. In addition, the orifices $37_L$, $37_R$ and 38 open into the intake ports $35_L$ and $35_R$ and the discharge ports $36_L$ and $36_R$ which are provided concavely in the first side plate, and therefore, the openings of the orifices $37_L$, $37_R$ and 38 cannot be occluded by the vanes 32. Moreover, the length of an oil passage connected to the orifices $37_L$, $37_R$ and 38 can be kept to a minimum to reduce the size of the hydraulic coupling device H. Furthermore, the orifices $37_L$, $37_R$ and 38 and the oil passage can be easily formed by machining without bringing about an increase in number of parts. Further, the left and right vane pumps $P_L$ and $P_R$ commonly use the first side plate 28, which can contribute to a reduction in number of parts.

Figure 9:
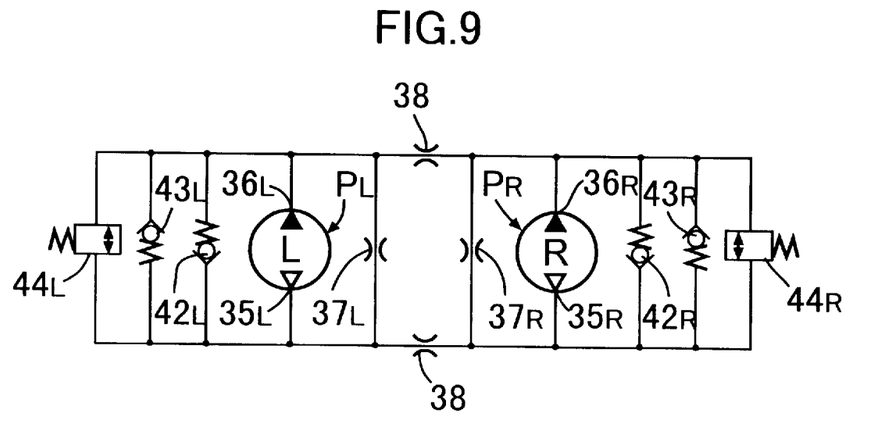
FIG. 9 is a view similar to FIG. 8, but according to a second embodiment of the present invention.

A second embodiment of the present invention will now be described with reference to FIG. 9.

In the second embodiment, a pair of relief valves $42_L$ and $43_L$ and a centrifugal valve $44_L$ are connected in parallel to the left first orifice $37_L$ of the left vane pump $P_L$, and a pair of relief valves $42_R$ and $43_R$ and a centrifugal valve $44_R$ are connected in parallel to the right first orifice $37_R$ of the right vane pump $P_R$.

When the left and right vane pumps $P_L$ and $P_R$ are rotated in a normal direction at the start of forward movement of the vehicle V or the like, the left and right relief valves $43_L$ and $43_R$ are opened if the hydraulic pressure of the working oil discharged from the discharge ports $36_L$ and $36_R$ exceeds a predetermined value. When the left and right vane pumps $P_L$ and $P_R$ are rotated in a reverse direction at the start of backward movement of the vehicle V or the like, the left and right relief valves $42_L$ and $42_R$ are opened if the hydraulic pressure of the working oil discharged from the intake ports $35_L$ and $35_R$ exceeds a predetermined value. The centrifugal valves $44_L$ and $44_R$ are provided in the first side plate 28, and if the numbers of rotation of the first side plate 28 (namely, the numbers of rotation of the cam ring 27) is increased beyond a predetermined value, the centrifugal valves $44_L$ and $44_R$ are opened by the action of a centrifugal force to put the discharge ports $36_L$ and $36_R$ and the intake ports $35_L$ and $35_R$ into communication with each other.

According to the second embodiment, when the pressure discharged from the left and right vane pumps $P_L$ and $P_R$ is smaller due to a smaller difference in numbers of rotation between the front wheels $W_{FL}$ and $W_{FR}$ and the rear wheels $W_{RL}$ and $W_{RR}$, the relief valves $42_L$, $42_R$, $43_L$ and $43_R$ are maintained in their closed states to provide the same effect as in the first embodiment. When the difference in numbers of rotation between the front wheels $W_{FL}$ and $W_{FR}$ and the rear wheels $W_{RL}$ and $W_{RR}$ is increased to increase the hydraulic pressure upstream of the first orifices $37_L$ and $37_R$, the relief valves $43_L$ and $43_R$ rotated in the normal direction or the relief valve $42_L$ and $42_R$ rotated in the reverse direction are opened, so that in place of the left and right first orifices $37_L$ and $37_R$, the working oil is passed through relief valves $42_L$, $42_R$, $43_L$ and $43_R$ having a flow resistance smaller than that of the first orifices $37_L$ and $37_R$. Thus, the upper limit value for the load of the left and right vane pumps $P_L$ and $P_R$, i.e., the driving force transmitted to the rear wheels $W_{RL}$ and $W_{RR}$ can be set at any value in accordance with the opening pressure for the relief valves $42_L$, $42_R$, $43_L$ and $43_R$.

When the numbers of rotation of the first side plate 28 rotated in operative association with the front wheels $W_{FL}$ and $W_{FR}$ with traveling of the vehicle at a high speed is increased, the centrifugal valves $44_L$ and $44_R$ are opened to put the discharge ports $36_L$ and $36_R$ and the intake ports $35_L$ and $35_R$ of the left and right vane pumps $P_L$ and $P_R$ into communication with each other. Thus, it is possible to prevent the load from being generated in the left and right vane pumps $P_L$ and $P_R$ during traveling of the vehicle V at the high speed, and to maintain the vehicle V in the front wheel drive state.

Figure 10:
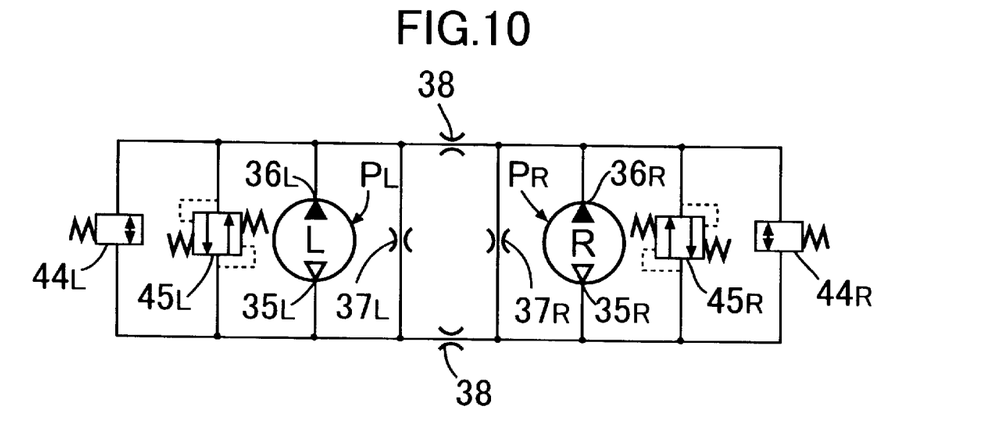
FIG. 10 is a view similar to FIG. 8, but according to a third embodiment of the present invention.

A third embodiment of the present invention will now be described with reference to FIG. 10.

In the third embodiment, the relief valves $42_L$ and $43_L$ of the left vane pump $P_L$ in the second embodiment are replaced by a relief valve $45_L$ comprising a pilot valve, and the relief valves $42_R$ and $43_R$ of the right vane pump $P_R$ in the second embodiment are replaced by a relief valve $45_R$ comprising a pilot valve. When the hydraulic pressure in the discharge ports $36_L$ and $36_R$ of the vane pumps $P_L$ and $P_R$ is increased during forward traveling of the vehicle V, the relief valves $45_L$ and $45_R$ are opened to invalidate the first orifices $37_L$ and $37_R$, and when the hydraulic pressure in the intake ports $35_L$ and $35_R$ of the vane pumps $P_L$ and $P_R$ is increased during backward traveling of the vehicle V, the relief valves $45_L$ and $45_R$ are opened to shunt the first orifices $37_L$ and $37_R$. According to the third embodiment, the four relief valves $42_L$, $42_R$, $43_L$ and $43_R$ are replaced by the two relief valves $45_L$ and $45_R$, whereby the number of parts can be reduced.

Figure 11A:
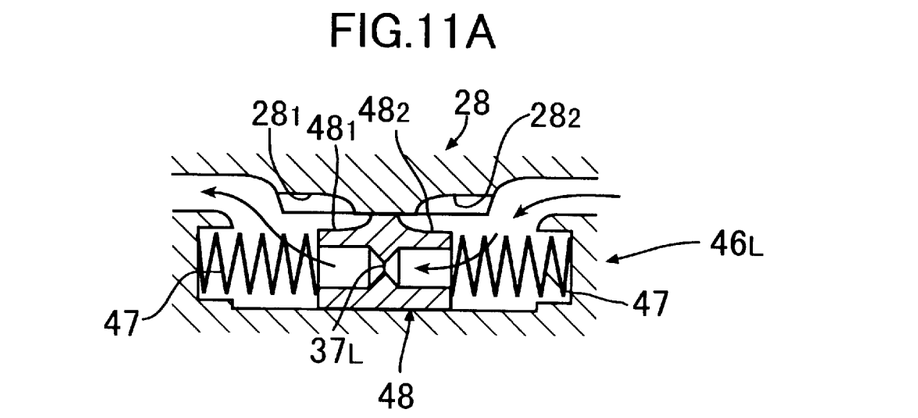
FIGS. 11A and 11B are views showing a relief valve having an orifice according to a fourth embodiment of the present invention.
Figure 11B:
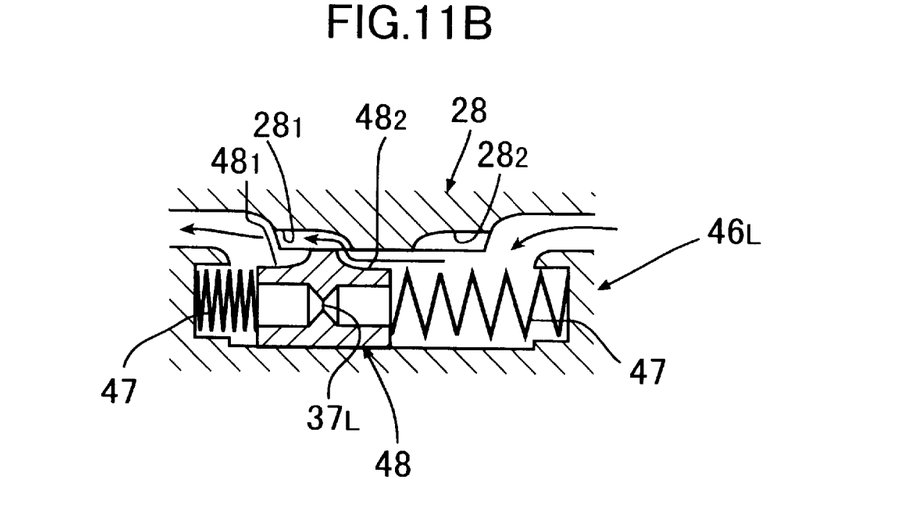

A fourth embodiments of the present invention will now be described with reference to FIGS. 11A and 11B.

In the fourth embodiment, the left first orifice $37_L$ and the relief valve $45_L$ in the left vane pump $P_L$ of the third embodiment are replaced by a single relief valve $46_L$ having an orifice, and the right first orifice $37_R$ and the relief valve $45_R$ in the left vane pump $P_L$ of the third embodiment are replaced by a single relief valve $46_R$ having an orifice. The relief valves $46_L$ and $46_R$ having the orifices have the same structure, and the left relief valve $46_L$ having the orifice is representatively shown in FIGS. 11A and 11B.

The left relief valve $46_L$ having the orifice provided in the first side plate 28 includes a spool 48 biased to a neutral position by a pair of springs 47. A left first orifice $37_L$ is defined to laterally extend through the spool 48. A pair of left and right globes $48_1$ and $48_2$ are formed on an outer peripheral surface of the spool 48, and a pair of left and right globes $28_1$ and $28_2$ are formed in the first side plate 28 and opposed to the globes $48_1$ and $48_2$.

When the difference in pressure between the discharge side and the intake side of the left vane pumps $P_L$ is smaller, the spool 48 is maintained at a substantially central position by the resilient force of the springs 47 and hence, the working oil is passed through the left first orifice $37_L$. When the difference in pressure between the discharge side and the intake side of the left vane pumps $P_L$ is increased, the spool 48 is moved, for example, leftwards by the pressure difference, whereby the globe $48_2$ of the spool 48 and the globe $28_1$ of the first side plate 28 are placed in communication with each other to shunt the first orifice $37_L$. When the spool 48 is moved rightwards by the pressure difference in an opposite direction, the globe $48_1$ of the spool 48 and the globe $28_2$ of the first side plate 28 are placed in communication with each other to shunt the first orifice $37_L$. According to the fourth embodiment, the four relief valves $42_L$, $42_R$, $43_L$ and $43_R$ and the two first orifices $37_L$ and $37_R$ are replaced by the two relief valves $46_L$ and $46_R$ having the orifices, whereby the number of parts can be further reduced.

Figure 12:
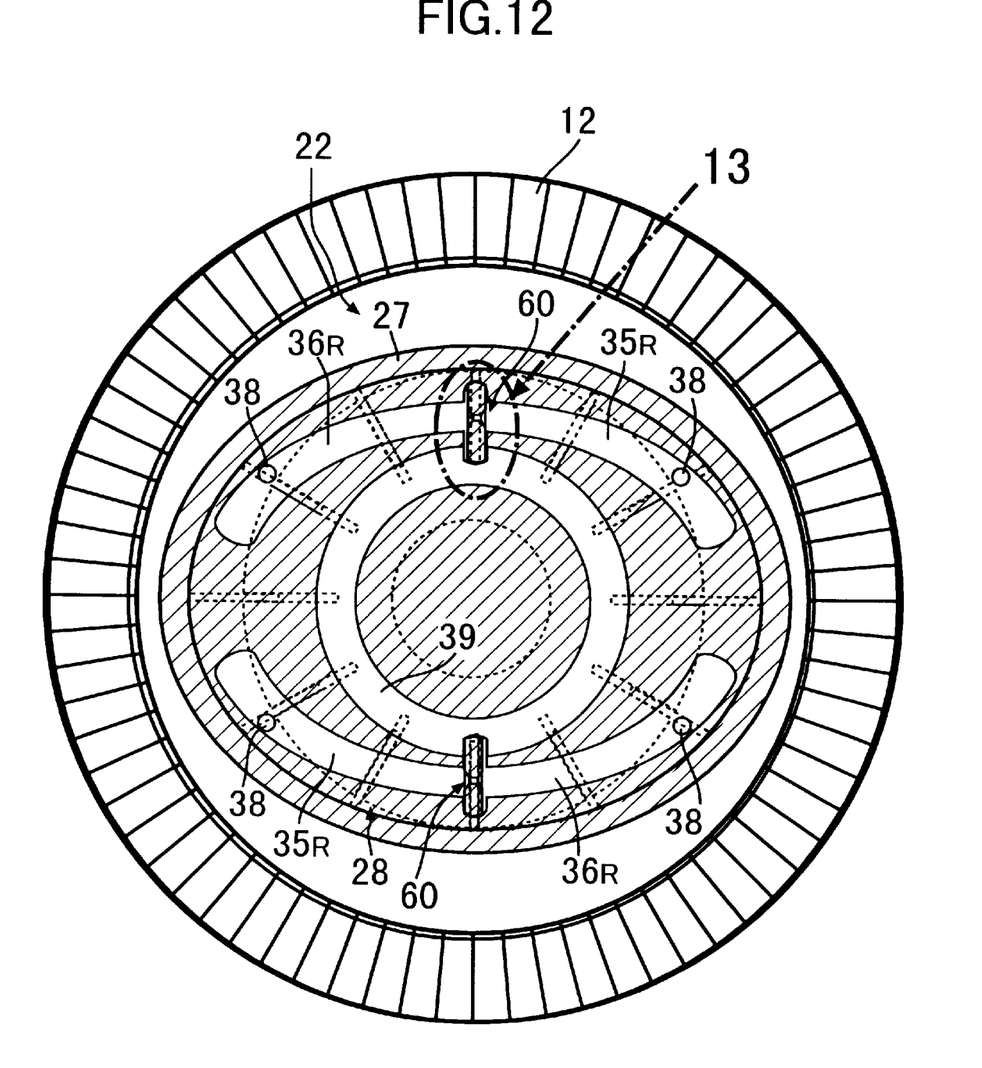
FIG. 12 is a view similar to the FIG. 3.
Figure 13:
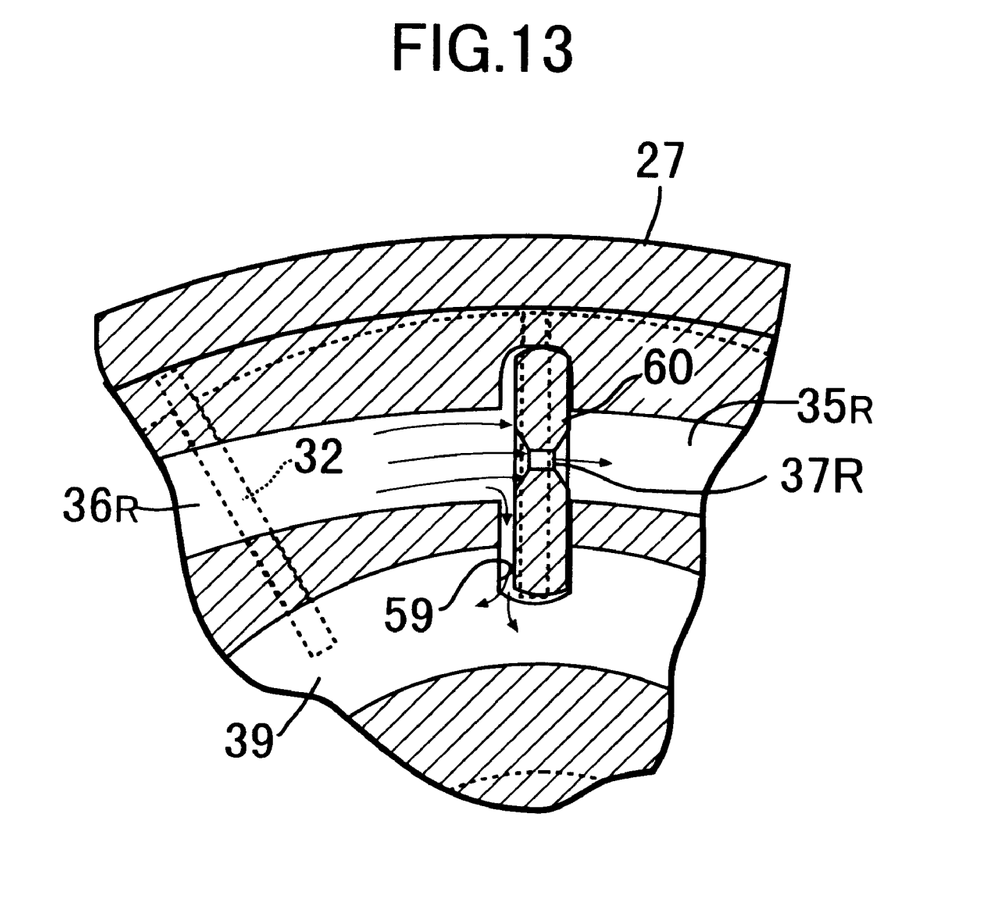
FIG. 13 is an enlarged view of a portion indicated by 13 in FIG. 12.

A fifth embodiment of the present invention will now be described with reference to FIGS. 12 and 13.

In the fifth embodiment, an orifice plate supporting groove 59 is defined in a right side of a first side plate 28 for permitting an intake port $35_R$, a discharge port $36_R$ and a vane push-up port 39 to be placed in communication with one another, and an orifice plate 60 having a right first orifice $37_R$ defined therein, is fitted into the orifice plate supporting groove 59. The orifice plate 60 is loosely fitted in a circumferential direction in the orifice supporting groove 59. An orifice plate 60 of a left vane pump $P_L$ is likewise provided on a left side of the first side plate 28.

Therefore, when hydraulic pressure is generated, for example, in the discharge ports $36_L$ and $36_R$, the orifice plate 60 is pushed against a wall surface of the orifice plate supporting groove 59 adjacent the intake ports $35_L$ and $35_R$. Thus, the discharge ports $36_L$ and $36_R$ and the intake ports $35_L$ and $35_R$ are placed in communication with each other through the first orifices $37_L$ and $37_R$, and as a result, a load can be generated in the vane pumps $P_L$ and $P_R$ to bring the vehicle into a four-wheel drive state. During this time, the hydraulic pressure generated in the discharge ports $36_L$ and $36_R$ is transmitted to the vane push-up port 39 through a groove defined between the orifice plate 60 and the orifice plate supporting groove 59. Thus, outer ends of the vanes 32 can be reliably brought into close contact with the cam ring 27 to generate a sufficient load in the vane pumps $P_L$ and $P_R$.

When the pressure in the intake ports $35_L$ and $35_R$ is increased to a higher level during backward traveling of the vehicle V, the orifice plate 60 is pushed against the wall surface of the orifice plate supporting groove 59 adjacent the discharge ports $36_L$ and $36_R$. Thus, as during forward traveling of the vehicle V, a load can be generated in the vane pumps $P_L$ and $P_R$ to bring the vehicle into the four-wheel drive state, and the higher pressure can be introduced into the vane push-up port 39. Therefore, during both of forward and backward traveling of the vehicle, it is possible to exhibit the load generating function of the vane pumps $P_L$ and $P_R$ and the pushing-up function of the vanes 32.

Figure 14:
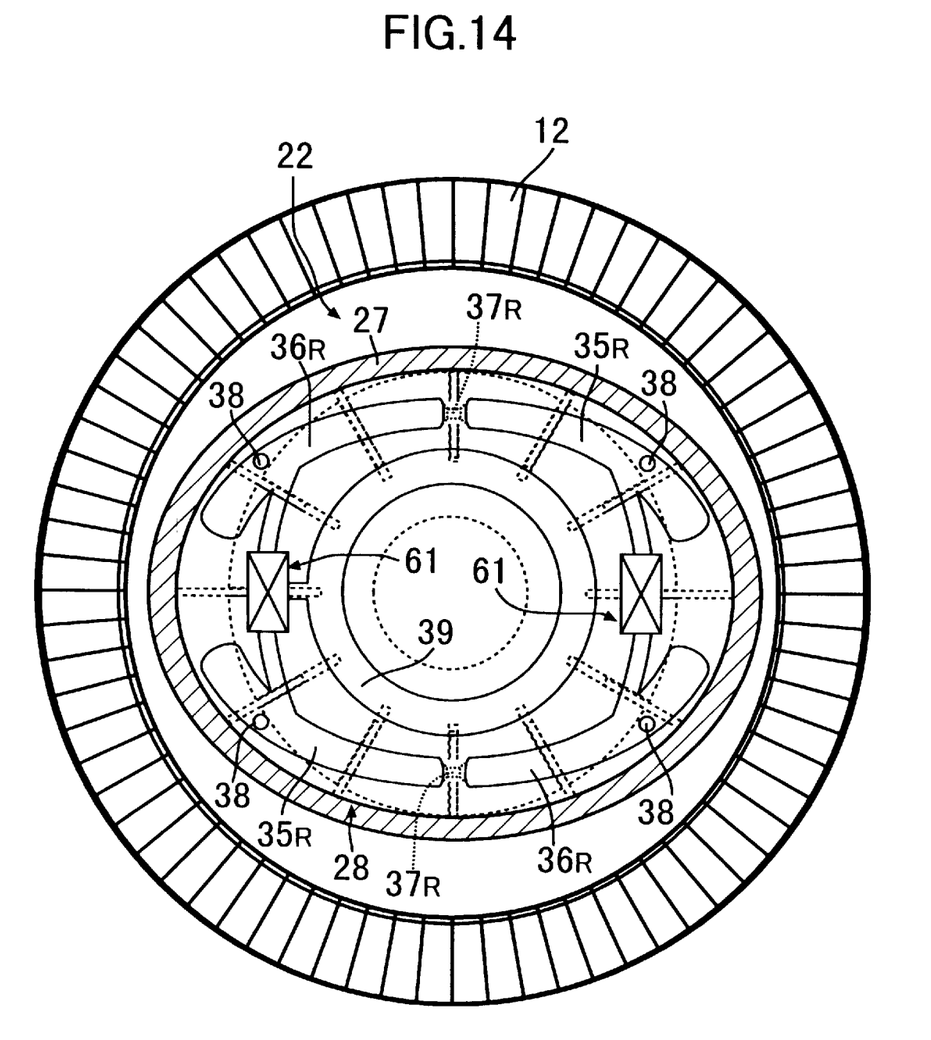
FIG. 14 is a view similar to FIG. 3.
Figure 15:
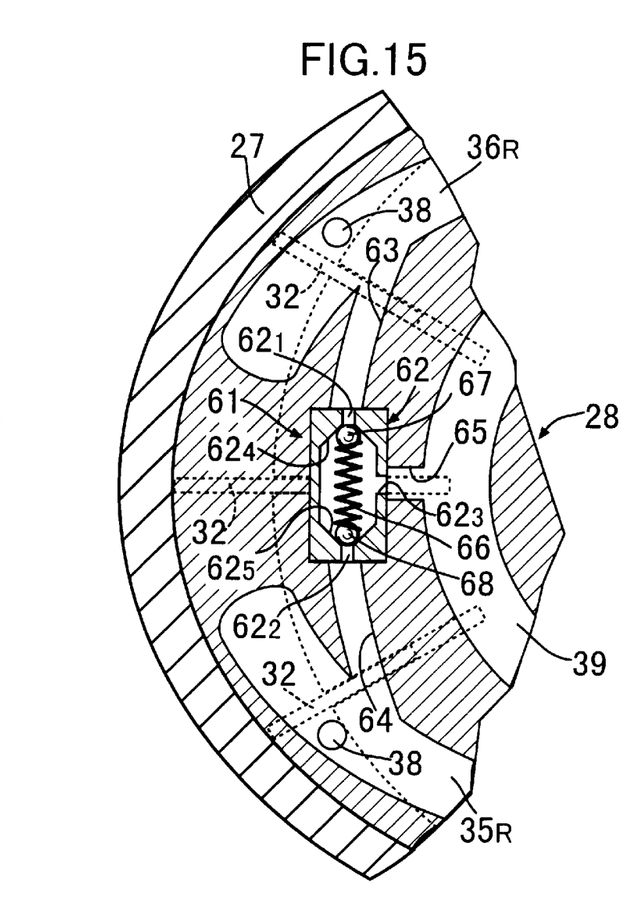
FIG. 15 is an enlarged view of an essential portion shown in FIG. 14.
Figure 16:
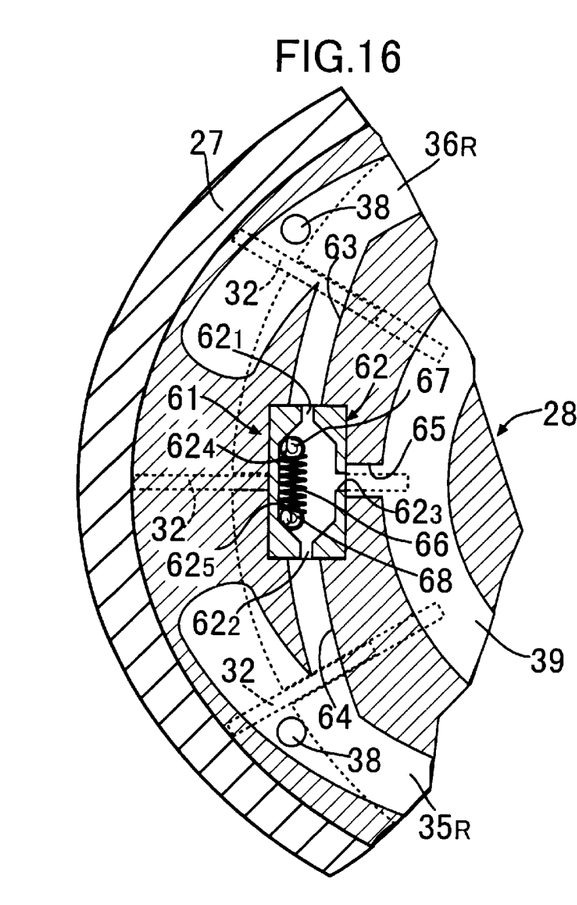
FIG. 16 is a view similar to FIG. 15 for explaining the operation.

A sixth embodiment of the present invention will now be described with reference to FIGS. 14 to 16.

The sixth embodiment includes a vane push-up valve 61 provided at each of the opposite ends of a right side of a first side plate 28 in the direction of the longer diameter. The vane push-up valve 61 also functions as a centrifugal valve, and includes a valve housing 62 which is fitted in a recess defined in the first side plate 28. Ports $62_1$ and $62_2$ defined at opposite ends of the housing 62, communicate with the discharge port $36_R$ and the intake port $35_R$ through oil passages 63 and 64, respectively, and a port $62_3$ defined at a central portion of the housing 62 communicates with the vane push-up port 39 through an oil passage 65. A pair of balls 67 and 68 carried at opposite ends of a spring 66 are accommodated within the housing 62. One ball 67 is in close contact with the port $62_1$ under the action of a resilient force of the spring 66, and the other ball 68 is in close contact with the port $62_2$ under the action of the resilient force of the spring 66. A vane push-up valve 61 of a left vane pump $P_L$ is likewise provided in the left side of the first side plate 28.

Therefore, when hydraulic pressure is generated in the discharge ports $36_L$ and $36_R$ during forward traveling of the vehicle, the ball 67 is moved away from the port $62_1$ against the resilient force of the spring 66 by the hydraulic pressure and hence, the hydraulic pressure in the discharge ports $36_L$ and $36_R$ is introduced into the vane push-up port 39 to reliably bring the outer ends of the vanes 32 into close contact with the cam ring 27. When hydraulic pressure is generated in the discharge ports $36_L$ and $36_R$ during backward traveling of the vehicle, the ball 68 is moved away from the port $62_2$ against the resilient force of the spring 66 by the hydraulic pressure and hence, the hydraulic pressure in the intake ports $35_L$ and $35_R$ is introduced into the vane push-up port 39 to reliably bring the outer ends of the vanes 32 into close contact with the cam ring 27.

When the rotational speed of the first side plate 28 rotated in operative association with the front wheels $W_{FL}$ and $W_{FR}$ during traveling of the vehicle at a high speed, is increased, the two balls 67 and 68 are moved toward each other along slopes $62_4$ and $62_5$ by the action of the centrifugal force and hence, the pair of ports $62_1$ and $62_2$ are opened to put the discharge ports $36_L$ and $36_R$ and the intake ports $35_L$ and $35_R$ into communication with each other. Thus, during traveling of the vehicle V at the high speed, the left and right vane pumps $P_L$ and $P_R$ can be brought into no-load states, to maintain the front wheel drive state of the vehicle.

In the above described embodiments, the casing 24 of the hydraulic coupling device H is connected to the front wheels $W_{FL}$ and $W_{FR}$, and the rotors $13_L$ and $13_R$ are connected to the rear wheels $W_{RL}$ and $W_{RR}$. However the connecting relation can be reversed. In addition, in the above described embodiments, the cam ring 27 is integrally formed on the casing 24, but the cam ring 27 may be formed separately from the casing 24 and coupled to the casing 24.

Although the embodiments of the present invention have been described in detail, it will be understood that the present invention is not limited to the above-described embodiments, and various modifications in design may be made without departing from the spirit and scope of the invention defined in claims.

What is claimed is:

1. A power transmitting system in a four-wheel drive vehicle having an engine, left and right main driven wheels and left and right subsidiary driven wheels, comprising an input shaft driven by the engine and coupled to the left and right main driven wheels, a left drive shaft coupled to the left subsidiary driven wheel, a right drive shaft coupled to the right subsidiary driven wheel, a left vane pump having an intake port and a discharge port, operated in accordance with a difference between numbers of rotation of said input shaft and said left drive shaft, a right vane pump having an intake port and a discharge port, operated in accordance with a difference between numbers of rotation of said input shaft and said right drive shaft, said left and right vane pumps positioned between said left and right subsidiary driven wheels, left first orifice positioned between said intake port and said discharge port in said left vane pump, a right first orifice positioned between said intake port and said discharge port in said right vane pump, an intake second orifice positioned between said intake port in said left vane pump and said intake port in said right vane pump, a discharge second orifice positioned between said discharge port in said left vane pump, and said discharge port in said right vane pump, a cam ring, and a side plate, wherein each of said vane pumps includes a plurality of vanes and a rotor accommodated in a space surrounded by said cam ring and said side plate, said plurality of vanes radially, slidably carried on the rotor are in sliding contact at outer ends thereof with said cam ring, and wherein said left and right first orifices communicate between said left and right intake ports and said left and right discharge ports respectively and are formed in said side plate of the vane pumps.

2. A power transmitting system in a four-wheel drive vehicle according to claim 1, wherein said side plate of said left and right vane pumps is common to said left and right vane pumps, and said intake ports and said discharge ports of said left and right vane pumps are formed in opposite sides of said side plate, such that said intake ports and said discharge ports are opposed to each other, the bottoms of said intake ports and the bottoms of said discharge ports being placed in communication with each other by said second orifices extending through the side plate.

3. A power transmitting system in a four-wheel drive vehicle according to claim 1, further including a relief valve connected in parallel to each of said first orifices for opening in accordance with an increase in pressure from said left and right vane pumps respectively.

4. A power transmitting system in a four-wheel drive vehicle according to claim 1, further including a centrifugal valve connected between each of said intake ports and said discharge ports for opening in accordance with an increase in the numbers of rotation of said input shaft.

5. A power transmitting system in a four-wheel drive vehicle according to claim 3, further including a centrifugal valve connected between each of said intake ports and said discharge ports in parallel to said relief valves for opening in accordance with an increase in the numbers of rotation of said input shaft.

6. A power transmitting system in a four-wheel drive vehicle according to claim 3, wherein said relief valves are pilot valves.

7. A power transmitting system in a four-wheel drive vehicle according to claim 1, further including an annular vane push-up port faced radially by the inner ends of said vanes, and an orifice plate supporting groove connecting said vane push-up port between said intake ports and said discharge ports, said annular vane push-up port and said orifice plate supporting groove being formed in said side plate, and the orifice plate having the first orifices formed therein, being loosely fitted in said orifice plate supporting groove.

8. A power transmitting system in a four-wheel drive vehicle according to claim 1, further including an orifice plate supporting groove formed in said side plate and an orifice plate movably positioned in said orifice plate supporting groove, wherein discharge ports are formed in said orifice plates.

9. A power transmitting system in a four-wheel drive vehicle according to claim 1, wherein said left and right vane pumps each include a plurality of vanes and wherein said first side plate includes vane push-up valves therein for controlling the flow of working oil into said vane pumps for radially moving said vanes within said vane pumps.

10. A power transmitting system in a four-wheel drive vehicle according to claim 1, wherein said push-up valves are centrifugal valves.

* * * * *